(12) United States Patent
Tan et al.

(10) Patent No.: US 8,866,880 B2
(45) Date of Patent: Oct. 21, 2014

(54) DISPLAY-CAMERA SYSTEM WITH SELECTIVE CROSSTALK REDUCTION

(71) Applicant: Hewlett-Packard Development Company, L.P., Fort Collins, CO (US)

(72) Inventors: Kar-Han Tan, Palo Alto, CA (US); Wei Hong, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/627,849

(22) Filed: Sep. 26, 2012

(65) Prior Publication Data

US 2014/0085401 A1   Mar. 27, 2014

(51) Int. Cl.
*H04N 13/00* (2006.01)
(52) U.S. Cl.
USPC ............................................................. 348/42
(58) Field of Classification Search
CPC ............ G09G 2320/0209; G09G 5/14; G09G 2340/12; G02B 27/225; H04N 13/0438; H04N 13/0486; H04N 13/0018; H04N 7/144
USPC ................................. 348/14.07, 14.08, 222.1, 42
See application file for complete search history.

(56) References Cited

U.S. PATENT DOCUMENTS

| | | | |
|---|---|---|---|
| 7,973,740 B2 | 7/2011 | Masutani et al. | |
| 2009/0244266 A1 | 10/2009 | Brigham | |
| 2012/0062449 A1 | 3/2012 | Apostolopoulos et al. | |
| 2012/0062799 A1 | 3/2012 | Apostolopoulos et al. | |
| 2014/0022340 A1* | 1/2014 | Dane et al. ...................... | 348/42 |

OTHER PUBLICATIONS

Li, B. et al.; "Evaluating the Impact of Crosstalk on Shutter-type Stereoscopic 3D Displays"; http://enpub.fulton.asu.edu/resp/vpqm/vpqm12/Papers/vpqm12_p18.pdf.

* cited by examiner

*Primary Examiner* — Mohammad Islam

(57) ABSTRACT

A method performed by a display-camera system includes displaying first content and second content that occludes a portion of the first content on a display during a first time period, displaying the second content and third content on the display during a second time period that is non-overlapping with the first time period, the third content to minimize crosstalk from the first content, and capturing fourth content with a camera through the display during the second time period.

15 Claims, 3 Drawing Sheets

DISPLAY-CAMERA SYSTEM WITH SELECTIVE CROSSTALK REDUCTION

BACKGROUND

Remote collaboration and videoconferencing systems allow remotely located users to collaborate with one another. Users at one location can see and interact with users at other locations in real-time and without noticeable delay. Some of these systems may provide gaze awareness by placing a camera behind a see-through display. Although the camera is designed to capture images of a viewer of the display, the captured images will typically include crosstalk from the displayed images unless video crosstalk reduction techniques are applied. Video crosstalk reduction techniques, however, may impact the quality of the displayed images.

DETAILED DESCRIPTION

Figure 1:
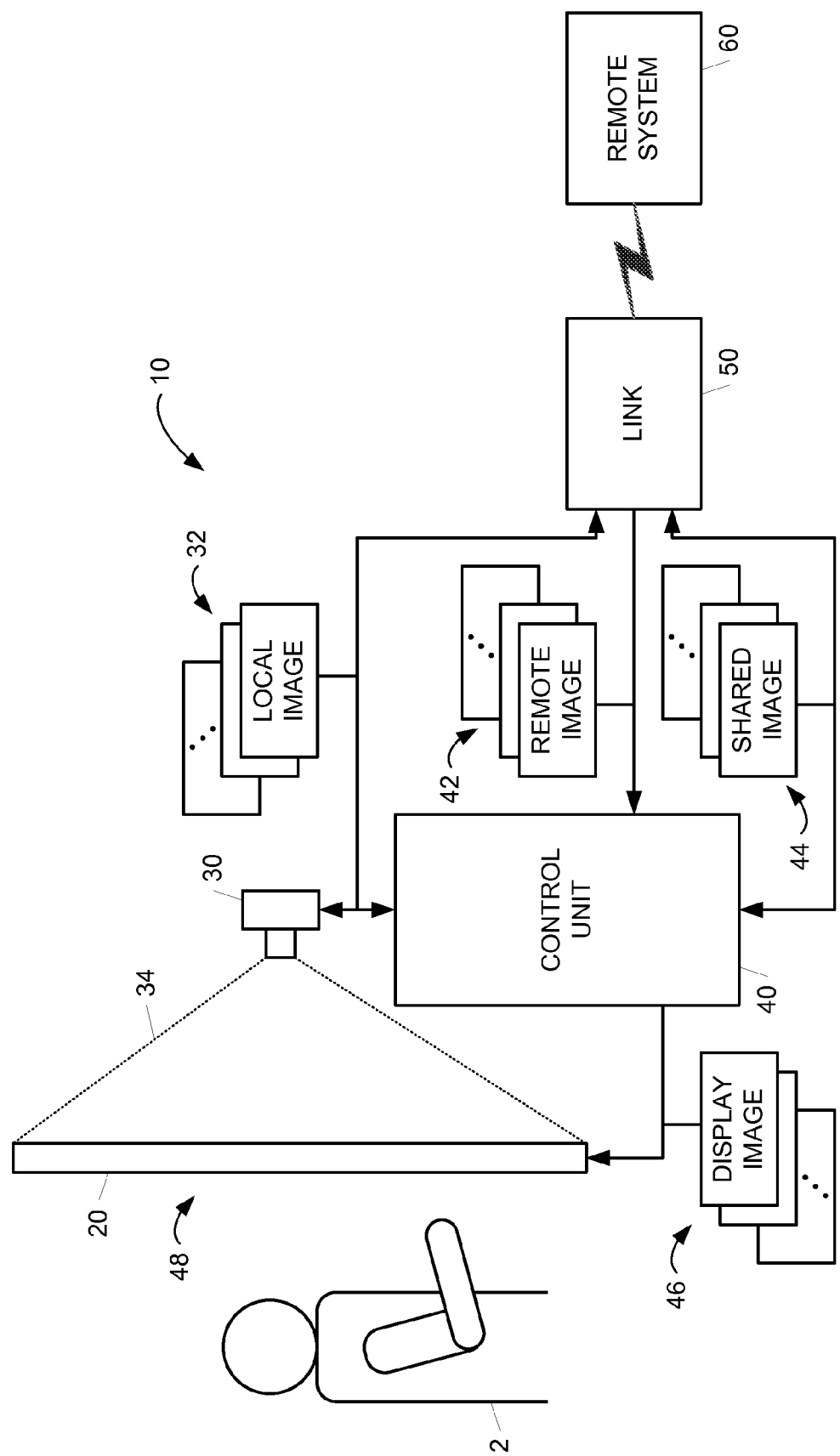
FIG. 1 is a schematic diagram illustrating an example of a display-camera system with selective time-division multiplexing crosstalk reduction.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term content refers to visual and/or audio information that is reproduced for a user using any suitable video and/or audio output devices for the display-camera systems described herein. The terms local and remote are descriptive terms that define a physical separation of between the described systems, persons, or objects and other systems, persons, or objects. The physical separation may be any suitable distance between locations such as a short distance within the same room or between adjacent rooms of a building or a long distance between different countries or between Earth and outer space.

The term local content refers to content that is captured or provided by a local system (e.g., a local display-camera system), and the term remote content refers to content that is captured or provided by a remote system (e.g., a remote display-camera system). The term local user refers to a person who views a local display-camera system, and the term remote user refers to a person who views a remote display-camera system. The term shared content refers to content that displayed on both a local display-camera system and a remote display-camera system such that the same content is viewable by both a local user or users and a remote user or remote users from different locations.

The term occluding content refers to content that is composited on top of other content such that the other content is occluded in the portion of a display that displays the occluding content. The term occluded content refers to content that is occluded in the portion of a display that displays occluding content.

As described herein, a display-camera system is configured to implement selective time-division multiplexing crosstalk reduction. The display-camera system receives remote content from a remote system (e.g., a remote display-camera system) that may include captured images of one or more remote users and displays the remote content to one or more local users using a display. The display-camera system also captures local content of the local users through the display using a camera and transmits the local content to the remote system. This communication between the display-camera system and the remote system allows local and remote users to interact collaboratively with natural interactions that include eye contact and gaze awareness. The display-camera system may be used in remote collaboration or videoconferencing systems or in human-machine interactions (e.g., automatic teller machine (ATM)) transactions, for example.

Video crosstalk in the local content captured by the camera may occur if the content displayed to the local users by the display is captured by the camera. Time-division multiplexing may be used to reduce video crosstalk by preventing the remote content from being displayed by the display while the camera captures the local content. This multiplexing, however, may reduce the perceptual brightness of the remote content seen by the local users as a consequence of not displaying the remote content while the camera captures the local content.

The display-camera system described herein enhances the benefits of time-division multiplexing by implementing selective time-division multiplexing. In particular, the display-camera system identifies portions of content that will be occluded by other content displayed by the display. For example, content that is displayed in the same relative positions on both the display-camera system and the remote system (e.g., shared content) may occlude the same relative portions of the content displayed by the local and the remote displays. For occluding content (i.e., content that occludes a portion of other content), the display-camera system selectively causes the occluding content, but not the other content, to be displayed while the camera captures the local content. By doing so, the display-camera system effectively turns off video crosstalk reduction for these occluding portions while leaving the crosstalk reduction on for the non-occluded portions. As a result, the display-camera system selectively enhances the display quality of the occluding content to allow the local users to perceive an enhanced brightness of the occluding content.

Because the video crosstalk reduction is not used for occluding content, video crosstalk may occur in the local content captured by the camera and transmitted to the remote system. This crosstalk, however, will be largely unnoticeable when displayed to the remote users by the remote system because the portions of the captured local content with the crosstalk will be combined with the occluding content by the remote system when displayed. Thus, the remote users may also perceive an enhanced brightness of the occluding content.

While the non-occluded portions of content may not have the same enhanced brightness as the occluding content, the video crosstalk reduction eliminates or minimizes any video quality degradation from video crosstalk for these non-occluded portions.

FIG. 1 is a schematic diagram illustrating an example of a display-camera system 10 with selective time-division multiplexing crosstalk reduction. Display-camera system 10 receives remote content (shown as remote images 42) from a remote system 60 using a link 50 where the remote content may include captured images of one or more remote users (not shown). Display-camera system 10 forms display content (shown as display images 46) from the remote content and shared content, if any, (shown as shared images 44) and provides the display content to a display 20. Display-camera system 10 forms at least some of the display content in a way that implements selective time-division multiplexing as will be described in additional detail below. Display-camera system 10 displays the display content using display 20 to produce displayed content 48 that is viewable by a local user or users 2 of display-camera system 10. Display-camera system also captures local content (shown as local images 32) of local users 2 through display 20 using a camera 30 and transmits the local content to remote system 60 using link 50.

Display 20 receives display content from control unit 40 and displays the content as displayed content 48 to local users 2. In particular, display 20 receives display content as a sequence of display images 46 and successively displays images 46 in non-overlapping time periods. Display 20 includes a front side that forms an external surface for displaying displayed content 48 to local users 2 and a back side that faces the lens of camera 30. Display 20 is at least partially transparent to allow camera 30 to capture local content, including images of local users 2, through display 20. Display 20 may be a projector, a transparent liquid crystal display (LCD), or an organic light emitting diode (OLED) display. In some embodiments, display 20 may be sufficiently large so as to display life-size images of the remote users of remote system 60.

Camera 30 captures local content in response to control signals from control unit 40. In particular; camera 30 captures local content as a sequence of local images 32 that are captured in non-overlapping time periods. Camera 30 provides local images 32 to control unit 40 and/or link 50 for transmission to remote system 60. Camera 30 captures local images 32 within a field of view 34 and with a focal range that at least partially extends beyond the front side of display 20 (e.g., to capture the interactions of the local users 2 with display-camera system 10).

Camera 30 is disposed behind display 20 with a distance that is selected so that field of view 34 encompasses all or substantially all of the front side of display 20 in some embodiments. Camera may also be disposed relative to display 30 so that field of view 34 is aligned with all or a selected portion of the front side of display 20 to allow for a non-arbitrary mapping between camera 30 and display 20. Camera 30 may further be disposed relative to display 30 to capture images 32 with a sense of eye content and gaze awareness of local users 2.

Camera 30 represents any suitable type and number of cameras that capture images through display 20. Camera 30 may include any suitable image sensor, such as a digital charge couple device (CCD) or complementary metal-oxide-semiconductor (CMOS) active pixel sensor.

Control unit 40 provides control signals that control the operation of display 20, camera 30, and link 50. Control unit 40 receives remote images 42 from remote system 60 using link 50 and receives shared images 44 from remote system 60 or another remote system (not shown) using link 50 or from a memory in display-camera system 10 (not shown). Control unit 40 generates display images 46 using remote images 42 and/or shared images 44, as described in additional detail below, and provides display images 46 to display 20 to cause display 20 to display display images 46. Control unit 40 controls the operation of camera 30 to cause local images 32 to be captured and transmitted to remote system 60 using link 50.

Control unit 40 may be implemented using any suitable type of processing system (not shown) with a set of one or more processors configured to execute computer-readable instructions stored in a memory system. The memory system includes any suitable type, number, and configuration of volatile or non-volatile machine-readable storage media configured to store instructions and data. Examples of machine-readable storage media in the memory system include hard disk drives, random access memory (RAM), read only memory (ROM), flash memory drives and cards, and other suitable types of magnetic and/or optical disks. The machine-readable storage media are considered to be an article of manufacture or part of an article of manufacture. An article of manufacture refers to one or more manufactured components. When executed, the instructions cause control unit 40 to generate and provide display content and control signals to display 20. The instructions also cause control unit to 40 to generate and provide control signals to camera 30. The instructions also cause control unit to 40 to generate and provide control signals to link 50 to cause remote content and occluding content to be received from remote system 60 and/or other remote systems (not shown) and cause local content to be provided to remote system 60.

Link 50 includes any suitable type, number, and/or configuration of network and/or port devices or connections configured to allow display-camera system 10 to communicate with remote system 60 and/or other remote systems (not shown). The devices and connections of link 50 may operate according to any suitable networking and/or port protocols to allow information to be transmitted by display-camera system 10 to a network, remote system 60, and/or other remote systems (not shown) or received by display-camera system 10 from a network, remote system 60, and/or other remote systems (not shown).

Remote system 60 represents any suitable display-camera system, display system, and/or processing system located remotely from display-camera system 10. Remote system 60 captures and/or provides remote content to display-camera system 10 and receives local content from display-camera system 10.

As noted above, control unit 40 forms display images 46 using remote images 42 and shared images 44. To do so, control unit 40 composites remote images 42 and shared images 44 to generate display images 46. Prior to compositing remote images 42, control unit 40 may mirror each remote image 42 about a vertical axis along the center of each image 42 to compensate for each image 42 being captured from behind a remote display by a remote camera. In compositing remote images 42 and shared images 44, control unit 40 may opt to composite remote images 42 and shared images 44 such that shared images 44 occlude over one or more portions of remote images 42. Control unit 40 thereby identifies portions of content that will be occluded by other content displayed by display 20 (e.g., portions of shared content that will occlude remote content).

To implement selective time-division multiplexing, control unit 40 generates display images 46 with selective crosstalk reduction (referred to as selective crosstalk images 46) for display by display 20 during time periods when camera 30 captures local images 32. To do so, control unit 40 generates selective crosstalk images 46 to include only occluding content from images 42 or images 44 and not other content from either images 42 or images 44. The portions of selective crosstalk images 46 that do not include occluding content include crosstalk reduction content that may be a uniform black for projectors, a uniform white for liquid crystal displays (LCDs), or another color or pattern configured to minimize crosstalk from corresponding portions of content in other display images 46 displayed by display 20. The portions of selective crosstalk images 46 that include occluding content may generate crosstalk when captured in local images 32 by camera 30.

In forming display images 46 and selective crosstalk images 46, control unit 40 may select the amount of transparency of occluding content in display images 46 and selective crosstalk images 46. For example, control unit 40 may use alpha-blending to form display images 46 and selective crosstalk images 46 from remote images 42 and shared images 44. The amount of transparency may range from fully opaque to partially transparent. With fully opaque occluding content, the occluding content completely obscures the occluded content when displayed as displayed image 48 such that local users 2 cannot see the occluded content. With partially transparent occluding content, the occluding content partially obscures the occluded content when displayed as displayed image 48 such that some of the occluded content appears to be visible through the occluding content for local users 2. Although some video crosstalk from the occluding content may appear in local images 32 captured by camera 30 regardless of the amount of transparency, the amount of video crosstalk may increase as the transparency of the occluding content increases and decrease as the transparency of the occluding content decreases.

Control unit 40 causes display 20 to sequentially alternate the display of the selective crosstalk images 46 with the display of other display images 46, where the other display images 46 also include the occluding content as well as any other selected content from images 42 and 44. Control unit 40 causes camera 30 to capture local images 32 during the display of the selective crosstalk images 46 but not during the display of the other display images 46.

Figure 3:
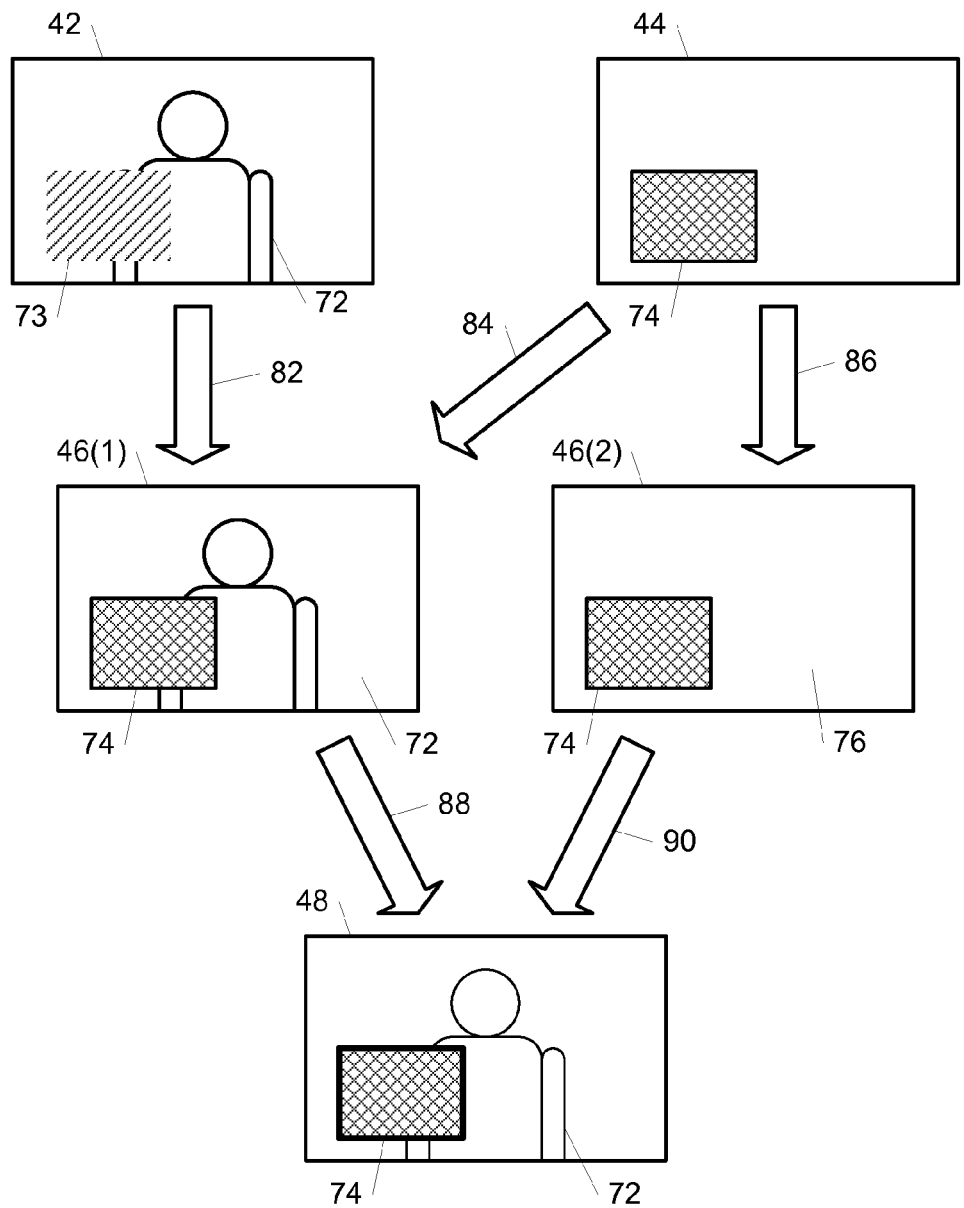
FIG. 3 is a block diagram illustrating an example of selecting content for images in selective time-division multiplexing crosstalk reduction.
Figure 4:
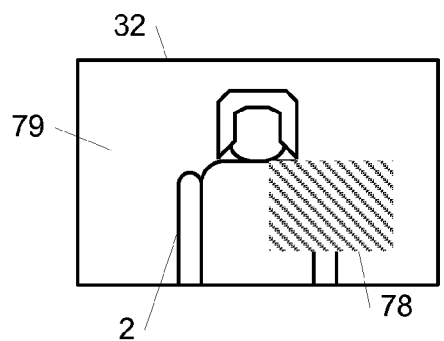
FIG. 4 is a block diagram illustrating an example of a captured image with selective crosstalk reduction.

An example of selective time-division multiplexing will now be described with reference to FIGS. 2-4.

Figure 2:
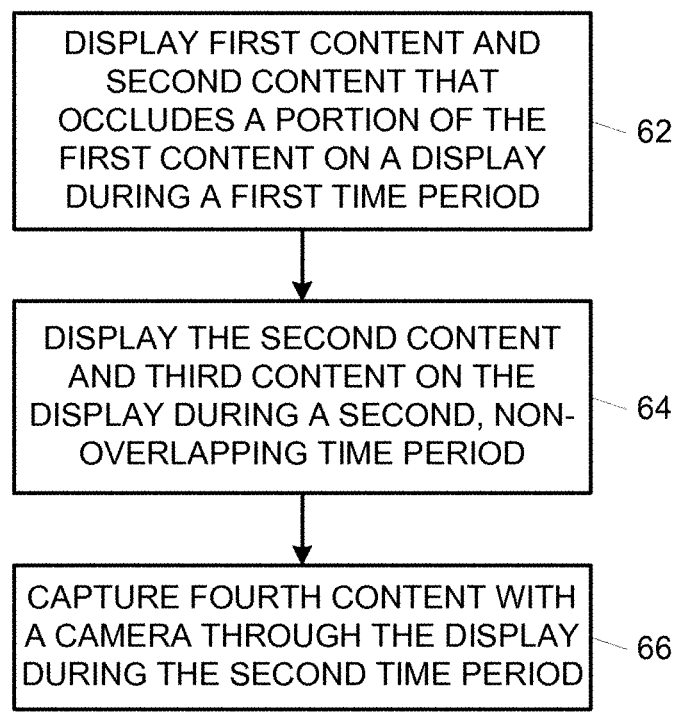
FIG. 2 is a flow chart illustrating an example of a method for implementing selective time-division multiplexing crosstalk reduction.

FIG. 2 is a flow chart illustrating an example of a method for implementing selective time-division multiplexing crosstalk reduction. The functions of FIG. 2 will be described with reference to control unit 40 in conjunction with display 20, camera 30, and link 50 as well as examples of a remote image 42, a shared image 44, display images 46(1)-46(2), and a displayed image 48 shown in FIG. 3, and a captured image 32 with selective crosstalk reduction shown in FIG. 4.

Control unit 40 causes first content from remote system 60 and second content that occludes a portion of the first content to be displayed on display 20 during a first time period as indicated in a block 62. Control unit 40 identifies the second content as occluding content and composites a display image 46 to include the first content and the second, occluding content. In the example shown in FIG. 3, control unit 40 may composite a remote image 46 (mirrored as described above, if necessary) of a remote user 72 and shared image 44 where the shared image 44 includes occluding content 74 that corresponds to a portion 73 of remote image 42 to form a display image 46(1) as indicated by arrows 82 and 84. Thus, control unit 40 forms display image 46(1) to include both the remote content from remote image 46 (e.g., remote user 72) and the occluding content 74 from shared image 44. Control unit 40 provides display image 46(1) to display 20 for display during a first time period to form part of displayed image 48 as indicated by an arrow 88. As shown in displayed image 48, occluding content 74 occludes a portion of the remote content that shows user 72.

If remote system 60 also implements selective time-division multiplexing, then portion 73 of remote image 46 may include crosstalk from the remote display as captured by the remote camera of remote system 60. This crosstalk, however, will be largely unnoticeable by local users 2 because portion 73 is combined with the occluding content 74 when displayed on display 20.

Control unit 40 causes the second content and third content, but not the first content, to be displayed on display 20 during a second time period that is non-overlapping with the first time period, where the third content (i.e., crosstalk reduction content) is to minimize crosstalk from the first content, as indicated in a block 64. In the example of FIG. 3, control unit 46 forms a selective crosstalk image 46(2) by compositing occluding content 74 and crosstalk reduction content 76 where occluding content 74 is positioned by control unit 40 in the same relative location in both display image 46(1) and selective crosstalk image 46(2) as indicated by an arrow 86. The same content 74 is also positioned in the same relative position as images 46(1) and 46(2) as in a remote display image displayed by a display of remote system 60 in some embodiments. Crosstalk reduction content 76 is configured to minimize crosstalk from display images 46 displayed before and after selective crosstalk image 46(2) (e.g., display image 46(1) and a next display image 46 (not shown)). Control unit 46 does not include any of remote content from remote image 46 in selective crosstalk image 46(2).

Control unit 40 provides selective crosstalk image 46(2) to display 20 for display during a second time period 10 form part of displayed image 48 as indicated by an arrow 90. The second time period is subsequent to and non-overlapping with the first time period. As shown in displayed image 48, occluding content 74 continues to occlude a portion of the remote content that shows user 72. By being displayed in both display image 46(1) and selective crosstalk image 46(2), occluding content 74 appears to local users 2 with an enhanced brightness compared to the remote content (e.g., remote users 72).

Control unit 40 causes fourth content to be captured with camera 30 through display 20 during the second time period as indicated in a block 66. During the second time period, display 20 displays selective crosstalk image 46(2). Camera 30 captures a local image 32 (i.e., the fourth content) of local user 2 that may include crosstalk 78 in the portion of local image 32 that corresponds to occluding content 74 displayed as shown in FIG. 4. Local image 32, however, includes minimal, if any, crosstalk in the portions that correspond to crosstalk reduction content 76. Because camera 30 is disposed behind display 20, any crosstalk 78 appears on the opposite side of local image 32 compared to the displayed image 48.

Control unit 40 continues to perform the method of FIG. 2 for the sequence of remote images 42 and shared images 44 to continue to form display images 46 and selective crosstalk images 46. Display images 46 may be grouped as a first set of display images 46 with occluding content and other content and a second set of crosstalk reduction images 46 with the occluding content and crosstalk reduction content. Thus, control unit 40 causes images from the first and second sets of images 46 to be alternately displayed by display 20 during sequential non-overlapping time periods. Control unit 40 causes camera 30 to capture local content (i.e., local images 32) through display 20 during the time periods when images from the second set of images 46 (i.e., the crosstalk reduction images 46) are being displayed by display 20. Control unit 40 may switch between the display of images 46 from the different sets with sufficient frequency to prevent local users 2 from seeing any noticeable flicker generated in some embodiments.

The above embodiments of display-camera system 10 may advantageously provide natural interactivity between remotely located users including eye contact, gaze awareness, and media sharing. By using selective time-division multiplexing, display-camera system 10 may advantageously selectively enhance the display quality of occluding content to allow local users 2 to perceive an enhanced brightness of the occluding content while maintaining the benefits of time-division multiplexing for in the other areas of the display.

What is claimed is:

1. A method performed by a display-camera system with selective crosstalk reduction, the method comprising:
    displaying first content and second content that occludes a portion of the first content on a display during a first time period, at least one of the first content or the second content received from a remote system;
    displaying the second content and third content on the display during a second time period that is non-overlapping with the first time period, the third content to minimize crosstalk from the first content; and
    capturing fourth content with a camera through the display during the second time period.

2. The method of claim 1 wherein the first content includes a captured image of a remote user that is received from the remote system, wherein the second content includes shared content that is also displayed by the remote system, and wherein the fourth content includes a captured image of a local user.

3. The method of claim 1 further comprising:
    compositing the first content and the second content to form a first display image for displaying during the first time period; and
    compositing the second content and the third content to force a second display image for displaying during the second time period.

4. The method of claim 3 further comprising:
    compositing the second content in a same relative position in the first display image as in a remote display image displayed by the remote system.

5. The method of claim 1 further comprising:
    selecting an amount of transparency of the second content in forming the first and the second display images.

6. The method of claim 1 further comprising:
    providing the fourth content to the remote system.

7. A display-camera system comprising:
    a display;
    a camera; and
    a control unit to cause the display to sequentially display a first display image and a second display image and to cause the camera captures a local image through the display while the display is displaying the second display image;
    wherein the first display image includes first content and second content, wherein the second display image includes a first portion that includes third content to minimize crosstalk from the first display image and a second portion that includes the second content, and wherein at least one of the first content or the second content is received from a remote system.

8. The display-camera system of claim 7 wherein the second content occludes at least some of the first content when the first display image is displayed.

9. The display-camera system of claim 7 wherein the second content includes shared content that is displayed by the display and the remote system.

10. The display-camera system of claim 7 wherein the control unit is to composite the first content and the second content to form the first display image.

11. The display-camera system of claim 7 further comprising:
    a link to receive the first content from the remote system and provide the local image to the remote system.

12. An article comprising at least one non-transitory machine-readable storage medium storing instructions that, when executed by a processing system, cause the processing system to:
    cause images from first and second sets of display images to be alternately displayed by a display during sequential non-overlapping time periods; and
    cause a camera to capture third content through the display during the time periods when images from the second set of display images are being displayed by the display;
    wherein the first set of display images each include first content and second content that occludes a portion of the first content, wherein the second set of display images each include the second content but not the first content, and wherein at least one of the first content or the second content is received from a remote system.

13. The article of claim 12, wherein the first content includes a captured remote image of a remote user, wherein the second content includes shared content that is also displayed by the remote system, and wherein the third content includes a captured local image of a local user.

14. The article of claim 12, wherein the instructions when executed by the processing system, cause the processing system to:
    composite the first content and the second content to form the first set of display images.

15. The article of claim 12, wherein the third content includes a captured local image that includes a first portion with crosstalk from the second content and a second portion without crosstalk from the first content or the second content.

* * * * *

UNITED STATES PATENT AND TRADEMARK OFFICE
CERTIFICATE OF CORRECTION

| | |
|---|---|
| PATENT NO. | : 8,866,880 B2 |
| APPLICATION NO. | : 13/627849 |
| DATED | : October 21, 2014 |
| INVENTOR(S) | : Kar-Han Tan et al. |

It is certified that error appears in the above-identified patent and that said Letters Patent is hereby corrected as shown below:

In the Claims

In column 7, line 39, in Claim 3, delete "force" and insert -- form --, therefor.

In column 7, line 41, in Claim 4, delete "comprising;" and insert -- comprising: --, therefor.

In column 8, line 44, in Claim 14, delete "instructions" and insert -- instructions, --, therefor.

Signed and Sealed this
Tenth Day of March, 2015

Michelle K. Lee
*Deputy Director of the United States Patent and Trademark Office*